(12) United States Patent
Yurkovich et al.

(10) Patent No.: US 8,375,095 B2
(45) Date of Patent: Feb. 12, 2013

(54) OUT OF ORDER DURABLE MESSAGE PROCESSING

(75) Inventors: Jesse R. Yurkovich, Redmond, WA (US); Nicholas Alexander Allen, Redmond, WA (US); Edmund Samuel Victor Pinto, Duvall, WA (US); Stefan R. Batres, Sammamish, WA (US); Kenneth D. Wolf, Seattle, WA (US); Justin D. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 12/645,322

(22) Filed: Dec. 22, 2009

(65) Prior Publication Data

US 2011/0153713 A1 Jun. 23, 2011

(51) Int. Cl.
*G06F 15/16* (2006.01)
(52) U.S. Cl. ...................................... 709/206
(58) Field of Classification Search ............... 709/206
See application file for complete search history.

(56) References Cited

U.S. PATENT DOCUMENTS

| | | | | |
|---|---|---|---|---|
| 5,224,095 A * | 6/1993 | Woest et al. | | 370/401 |
| 5,237,568 A * | 8/1993 | Woest et al. | | 370/469 |
| 5,243,595 A * | 9/1993 | Woest et al. | | 370/469 |
| 5,249,184 A * | 9/1993 | Woest et al. | | 370/402 |
| 5,960,404 A | 9/1999 | Chaar et al. | | |
| 6,459,706 B1 | 10/2002 | Hayasaka | | |
| 6,842,763 B2 | 1/2005 | Kettley et al. | | |
| 7,277,913 B2 * | 10/2007 | Kashyap | | 709/203 |
| 7,454,751 B2 | 11/2008 | Sun et al. | | |
| 7,487,246 B2 * | 2/2009 | Astley et al. | | 709/226 |
| 7,519,669 B2 * | 4/2009 | Nikolov | | 709/206 |
| 7,584,474 B2 | 9/2009 | Gondi et al. | | |
| 7,644,118 B2 * | 1/2010 | Phillips | | 709/206 |
| 7,971,209 B2 * | 6/2011 | Eberlein et al. | | 719/328 |
| 2002/0087507 A1 | 7/2002 | Hopewell et al. | | |
| 2003/0229725 A1 | 12/2003 | Chen et al. | | |
| 2005/0060374 A1 * | 3/2005 | Phillips | | 709/206 |
| 2005/0256931 A1 * | 11/2005 | Follmeg et al. | | 709/206 |
| 2005/0262205 A1 * | 11/2005 | Nikolov et al. | | 709/206 |
| 2005/0262215 A1 * | 11/2005 | Kirov et al. | | 709/207 |
| 2005/0278410 A1 * | 12/2005 | Espino | | 709/201 |
| 2006/0020678 A1 * | 1/2006 | Kessler et al. | | 709/207 |
| 2006/0248145 A1 * | 11/2006 | Karmakar et al. | | 709/206 |
| 2006/0248214 A1 * | 11/2006 | Jackson et al. | | 709/231 |
| 2006/0271663 A1 * | 11/2006 | Barillari et al. | | 709/223 |

(Continued)

OTHER PUBLICATIONS

Alonso et al., Exotica / FMQM: A Persistent Message-Based Architecture for Distributed Workflow Management—Published Date: 1995 http://citeseerx.ist.psu.edu/viewdoc/summary?doi=10.1.1.53.1132 (18 pages).

(Continued)

*Primary Examiner* — Alicia Baturay
(74) *Attorney, Agent, or Firm* — Workman Nydegger

(57) ABSTRACT

The dispatching of messages from an incoming message pool to service instance(s). Message are received non-destructively and exclusively from the incoming message pool. If a particular service instance receives a message out of order, the processing of the message is deferred without releasing the exclusivity in the incoming message queue. Thus, the target service instance may continue to process one or more other messages until the target service instance is ready to process one or more deferred messages. In this way, messages may be pulled from the incoming message queue for dispatch to service instance(s), while maintaining correct order of processing, even if messages do not arrive into the incoming message queue in the correct order.

20 Claims, 9 Drawing Sheets

U.S. PATENT DOCUMENTS

| | | | |
|---|---|---|---|
| 2007/0011261 A1* | 1/2007 | Madams et al. ............... | 709/207 |
| 2007/0070907 A1* | 3/2007 | Kumar et al. ................. | 370/235 |
| 2007/0073821 A1* | 3/2007 | Brail ............................ | 709/206 |
| 2007/0106804 A1* | 5/2007 | Bosschaert et al. ........... | 709/229 |
| 2007/0124398 A1* | 5/2007 | Parkinson et al. ............ | 709/206 |
| 2007/0174393 A1* | 7/2007 | Bosschaert et al. ........... | 709/206 |
| 2007/0260669 A1* | 11/2007 | Neiman et al. ................ | 709/201 |
| 2008/0222248 A1* | 9/2008 | Eberlein et al. ............... | 709/204 |
| 2008/0263564 A1* | 10/2008 | Gambino ...................... | 719/314 |
| 2008/0267209 A1* | 10/2008 | Gallagher et al. ............ | 370/429 |
| 2010/0005147 A1* | 1/2010 | Johnson et al. ............... | 709/206 |
| 2010/0057863 A1* | 3/2010 | Allen et al. ................... | 709/206 |
| 2010/0179994 A1* | 7/2010 | Bittles et al. .................. | 709/206 |
| 2011/0107350 A1* | 5/2011 | Bittles et al. .................. | 719/314 |

OTHER PUBLICATIONS

Cugola, et al. Exploiting an Event-based Infrastructure to Develop Complex Distributed Systems—Published Date: 1998 http://home.dei.polimi.it/dinitto/papers/ICSE98CameraReady.pdf (10 pages).

* cited by examiner

1000

1001
Service Instance Indicate To Pool That Service Instance Ready To Process Message Of A Certain Type 1002
Apply Filter To Pool 1003
Receive Message Subject To Filter

*Figure 10*

OUT OF ORDER DURABLE MESSAGE PROCESSING

BACKGROUND

Our modern connected world is facilitated by message processors communicating messages back and forth. A message processor may be quite complex such as a fully capable computing system or even a collection of computing systems. Message processors frequently use queues to exchange messages reliably while providing isolation between message processors. Queues allow message processors requesting a service (i.e., "clients") to send application-level messages (hereinafter simply "messages") at any time without requiring a direct connection to the message processor (i.e., the "service") providing the service.

In a typical workflow process, a service instance is sometimes ready to handle messages, and sometimes not, depending on the service instance. If messages arrive out-of-order, the service instance may often not be able to handle the messages as they arrive.

Previous solutions to this problem fall into one of two categories: 1) those attempting to reimplement a secondary durable store to serve the workflow requests and 2) those attempting to handle out of order message consumption without regard to the underlying messaging transport. Neither category of solution fully embraced the ability to provide message assurances inside an existing durable store. The first category of solutions necessitated two or more locations for storing message data and complicated both verification of message assurances and transactional guarantees. The second category does not take advantage of queuing.

BRIEF SUMMARY

At least one embodiment described herein relates to the dispatching of messages from an incoming message pool to one or more service instances. As messages are dispatched from the incoming message pool to the target service instance, the message is non-destructively received from the incoming message pool so that a copy of the message is received, but a copy remains within the incoming message pool. In addition, the message is locked within the incoming message pool as it is received from the incoming message pool. Thus, the message remains in the incoming message pool for exclusive use by the target service instance for that message.

If a particular service instance receives a message out of order, the processing of the message is deferred without releasing the lock in the incoming message queue. Thus, the target service instance may continue to process one or more other messages until the target service instance is ready to process the deferred message. Deferral of one or more messages is possible. Thus, messages may be pulled from the incoming message queue for dispatch while maintaining correct order of processing, even if messages do not arrive into the incoming message queue in the correct order.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 10 illustrates a flowchart of a method for applying filtering to the incoming message pool.

DETAILED DESCRIPTION

In accordance with embodiments described herein, the dispatching of a message from an incoming message pool to service instance(s) is described. Messages are received non-destructively and exclusively from the incoming message pool. If a particular service instance receives a message out of order, the processing of the message is deferred without releasing the exclusivity in the incoming message pool. Thus, the target service instance may continue to process one or more other messages until the target service instance is ready to process one or more deferred messages. First, some introductory discussion regarding computing systems will be described with respect to FIG. 1. Then, various embodiments of out of order message processing will be described with reference to FIGS. 2 through 10.

Figure 1:
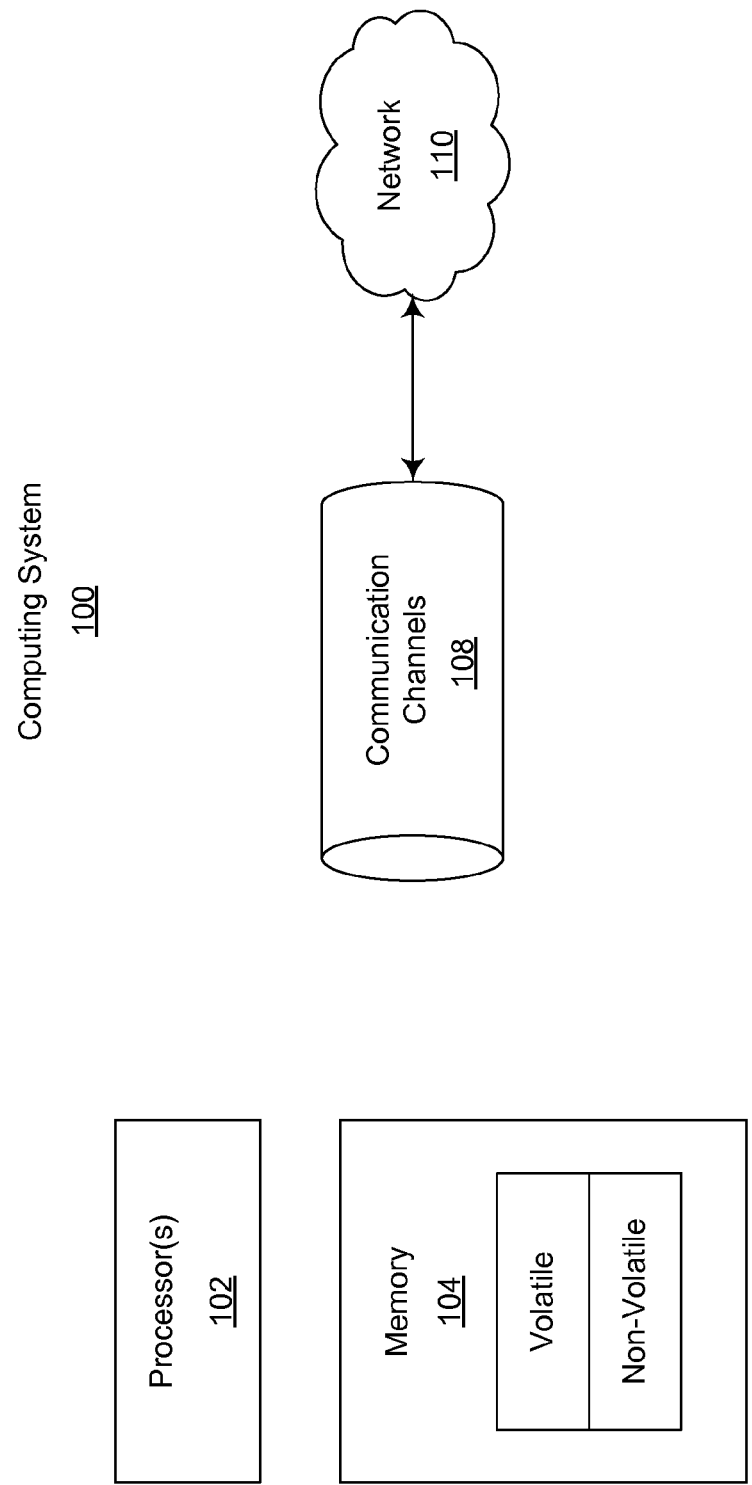
FIG. 1 illustrates an example computing system that may be used to employ embodiments described herein.

First, an introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
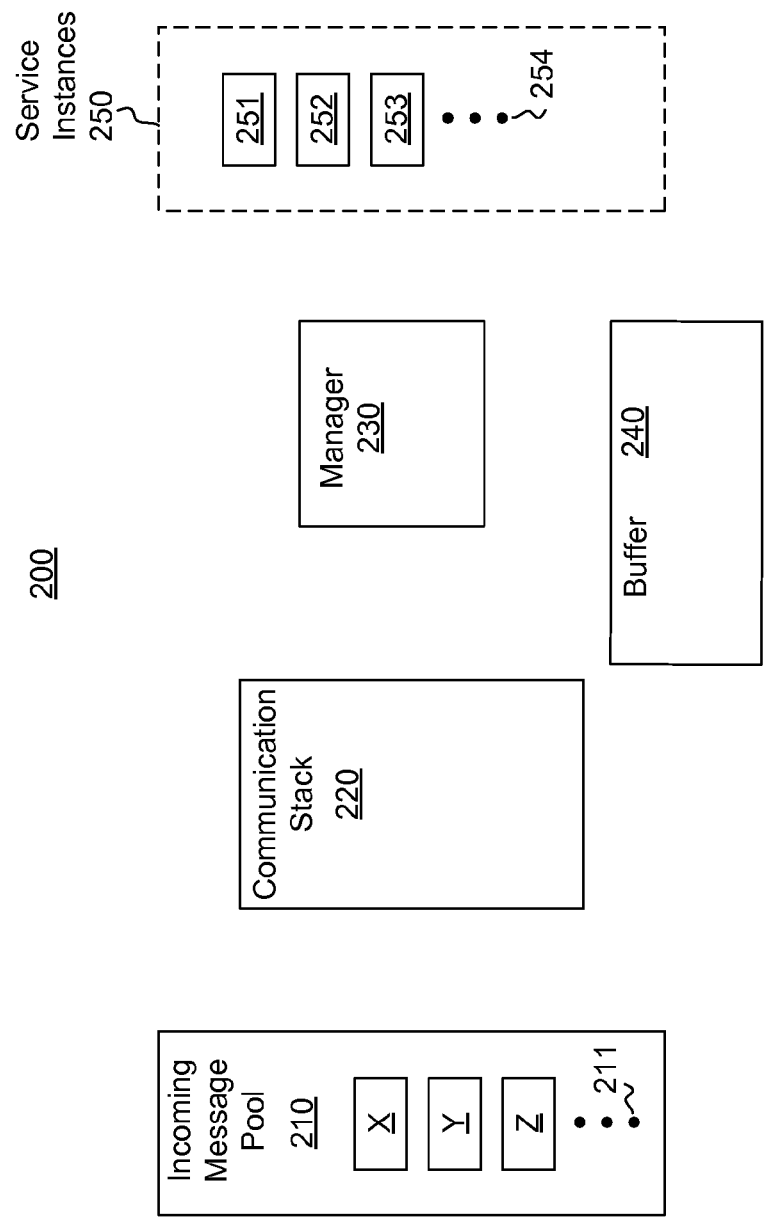
FIG. 2 illustrates a message processing environment in which the principles described herein may be employed.

FIG. 2 illustrates a message processing environment 200 that includes several components including an incoming message pool 210, a communication stack 220, a runtime service manager 230, a buffer 240, and a service instance set 250. Each of these several components may be implemented on a computing system such as the computing system 100 of FIG. 1. The various components may be present on a single computing system or may be distributed amongst various computing systems. Furthermore, each component itself may even be distributed.

The incoming message pool 210 includes a number of messages. In one example, the incoming message pool 210 may be a queue, although not required. The incoming message pool 210 may, however, be any message repository where incoming message may reside for a time, prior to being dispatched to one or more of the service instances 250.

In this example, the incoming message pool is illustrated as including three total messages including message X, message Y, and message Z. Such messages will be used primarily in an example to follow. However, as represented by the ellipses 211, the number of messages within the incoming message queue may be any number, and may vary over time as message arrive into the incoming message queue, and as messages are deleted from the incoming message queue in response to successful processing of the message. The messages may be, for example, application-level messages.

A communication stack 220 is configured to non-destructively and exclusively receive messages from the incoming message pool 210. In this description and in the claims, an act of non-destructively receiving a message from the message pool means that a copy of the message is received from the incoming message pool 210, while a copy of the message remains within the incoming message pool 210. Optionally, as part of this receive process, a filtration process may be performed as illustrated and described further below with respect to FIG. 10.

In this description and in the claims, an act of exclusively receiving a message from the message pool means that the copy of the message that remains in the incoming message pool 210 is locked (at least until the lock is released) for exclusive use by the service instance that is to process the message. Whenever messages are removed from the incoming message pool for processing, those message(s) that are locked are ignored or passed over. If the message is ultimately successfully processed, and the message is deleted from the incoming message pool 210. If the message is not successfully processed, or perhaps if time has expired for processing the message, the lock is released, and the message remains in the incoming message pool 210 at which time the message will no longer be passed over (at least until the message is once again locked). In one embodiment, the message may be non-destructively and exclusively read in an atomic operation such that the message is copied from the incoming message pool, and the message is locked in the message pool in an atomic operation.

The set of service instances 250 includes three service instances 251, 252 and 253 in this example. However, the ellipses 254 represents that there may be different numbers of service instances at any given time, and the number of service instances may fluctuate as service instances are created and destroyed at runtime. In one embodiment, the service instances are workflow service instances.

A runtime service manager 230 dispatches messages received by the communication stack 220 from the incoming message pool 210 to various service instances 250. If the message calls for the creation of a service instance, the runtime service manager 230 may cause the service instance to be created.

A buffer 240 acts to buffer messages that arrive out of order in the sense that the target service instance for the message is not ready to receive the message when it arrives. At some point, the message may be provided again from the buffer 240 once the target service instance is ready to process the message after the target service instance processes perhaps one or more intervening messages, after which time the buffered message is no longer out of order.

Figure 3:
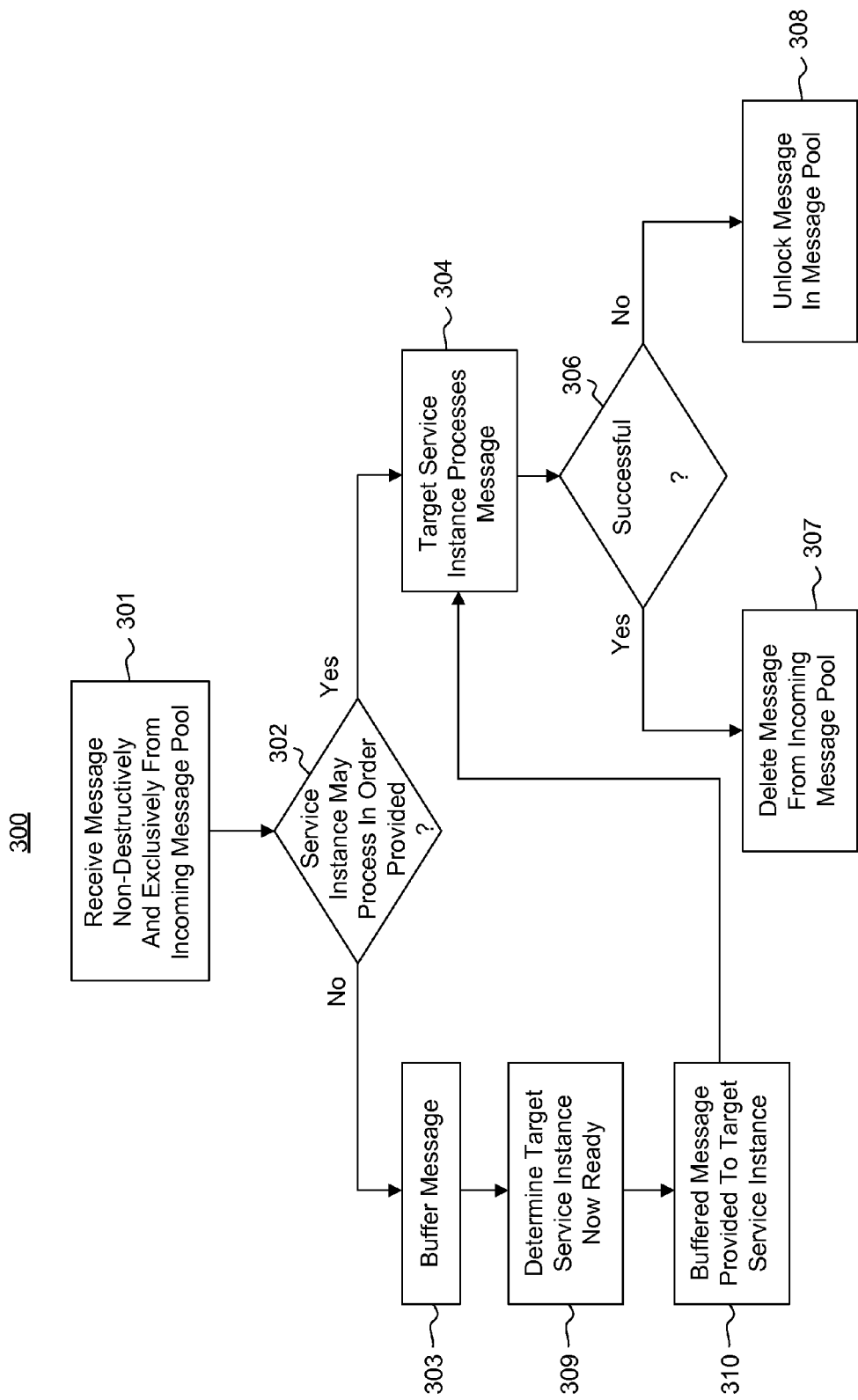
FIG. 3 illustrates a flowchart of a method for dispatching messages from an incoming message pool to a plurality of service instances.

FIG. 3 illustrates a flowchart of a method 300 for dispatching messages from an incoming message pool 210 to a plurality of service instances 250. As the method 300 may be performed in the environment 200 of FIG. 2, the method 300 will be described with frequent reference to both FIGS. 2 and 3. The method 300 is performed each time a message is received from the incoming message pool, such as the incoming message pool 210 of FIG. 2.

According to the method 300, a message is non-destructively and exclusively received from the incoming message pool (act 301). For instance, in FIG. 3, the communication stack 220 receives a copy of a message from the incoming message pool 210, and locks a copy of the message in the incoming message pool 210 for exclusive use by the target service instance.

The method 300 then determines whether any of the service instances (i.e., the then running service instance or a service instance that may be created) may process the message in the order provided (decision block 302). Referring to FIG. 2, the runtime service manager 230 determines whether any of the service instances 250 may process the message in the order provided.

If the message cannot be processed by any of the service instances in the order provided (No in decision block 302), then the message is buffered (act 303), all while a copy of the message remains locked in the incoming message pool for exclusive use by the target service instance. Referring to FIG. 2, if the runtime service manager 230 determines that the message cannot be processed in the order provided by any of the service instances 250, the message is buffered in buffer 240. Optionally, when a message is buffered, a log associated with the first message may be edited to include an indication that the particular service instance was temporarily unable to process the first message.

If, on the other hand, a service instance (i.e., one of the then running service instance or a service instance that may be created) can process the message in the order provided (Yes in decision block 302), the message is processed by the target service instance (act 304). If successfully processed (Yes in decision block 306), the copy of the message is deleted from incoming message pool (act 307). If unsuccessfully processed or if time expires for processing the message (No in decision block 306), the copy of the message is unlocked from the incoming message pool (act 308).

Referring to FIG. 2, if the runtime service manager 230 determines that one of the service instances 250 can process the message in the order provided, the message is processed by a particular targeted one of the service instances 250, and the message is deleted from the incoming message pool 210 if successfully processed, or unlocked from the incoming message pool 210 if unsuccessfully processed. Deletion, in this case, might not be a physical deletion, but might be a virtual deletion, in which the message is somehow marked as deleted to thereby be ignored thereafter by the communication stack 220.

Recall that a message that cannot be processed in the original order provided (No in decision block 302) is buffered (act 303). At some point thereafter, it is determined that a target service instance is ready for the buffered message (act 309), the buffered message is then provided from the buffer to the target service instance (act 310), where it may be further processed (act 304). Referring to FIG. 2, the message would be received by the communication stack 220, through the runtime service manager 230 and to the target service instance.

Figure 4:
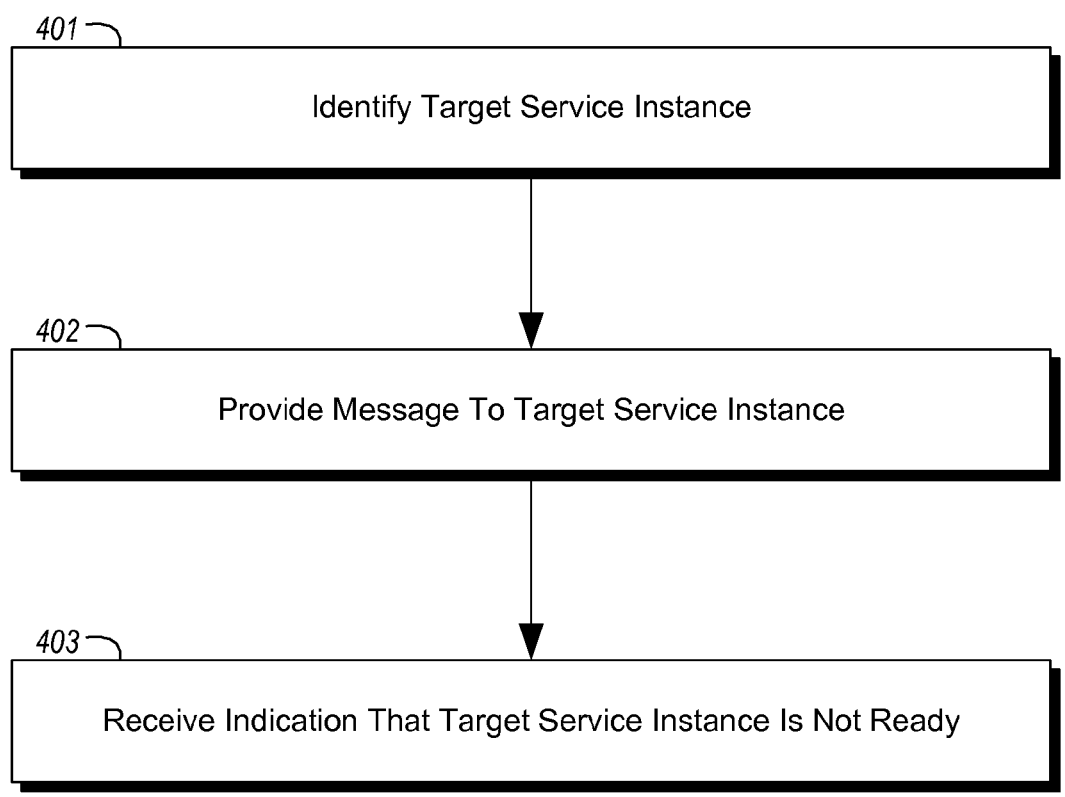
FIG. 4 illustrates a flowchart of a method for determining that none of the plurality of service instances is capable of processing a message.

FIG. 4 illustrates a method 400 for determining that none of the plurality of service instances is capable of processing a message (No in decision block 302). The runtime service manager 230 first identifies a particular target service instance that is to process the message (act 401). The runtime service manager then attempts to provide the message to the target service instance (act 402). The runtime service manager then receives a response from the target service instance indicating that the particular service instance is not capable of processing the message in the order provided (act 403). In this description and in the claims, a response or other type of message "indicates" content, if the content may be inferred from the message. The message need not expressly state the content in order to indicate the content under this broad definition.

Figure 5:
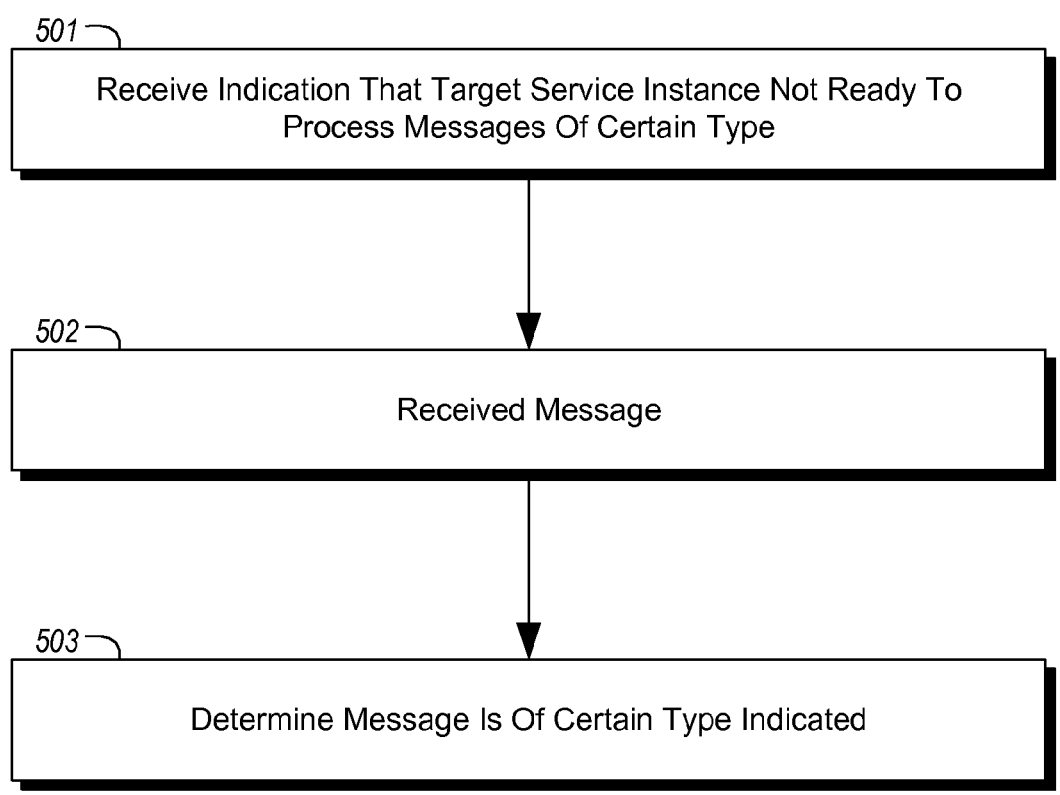
FIG. 5 illustrates a flowchart of an alternative method for determining that none of the plurality of service instances is capable of processing the message.

FIG. 5 illustrates an alternative method 500 for determining that none of the plurality of service instances is capable of processing the message (No in decision block 302). Under this alternative method, the runtime service instance discovers beforehand that the target service instance is not then ready to process a message of the type (act 501) that is to soon be received by the runtime service manager. After receiving the message (act 502), the runtime service manager determines that the message is of the particular type that the target service instance indicated that it is not ready to handle (act 503). At that point, the runtime service instance may determine that the target service instance is not ready to process the message (No in decision block 302). The target service instance may indicate that it is not ready to process messages of certain type by providing an exclusive list of message types it is ready to process, thus indicating that it is not ready to process messages of any particular type not appearing in the exclusive list.

Figure 6:
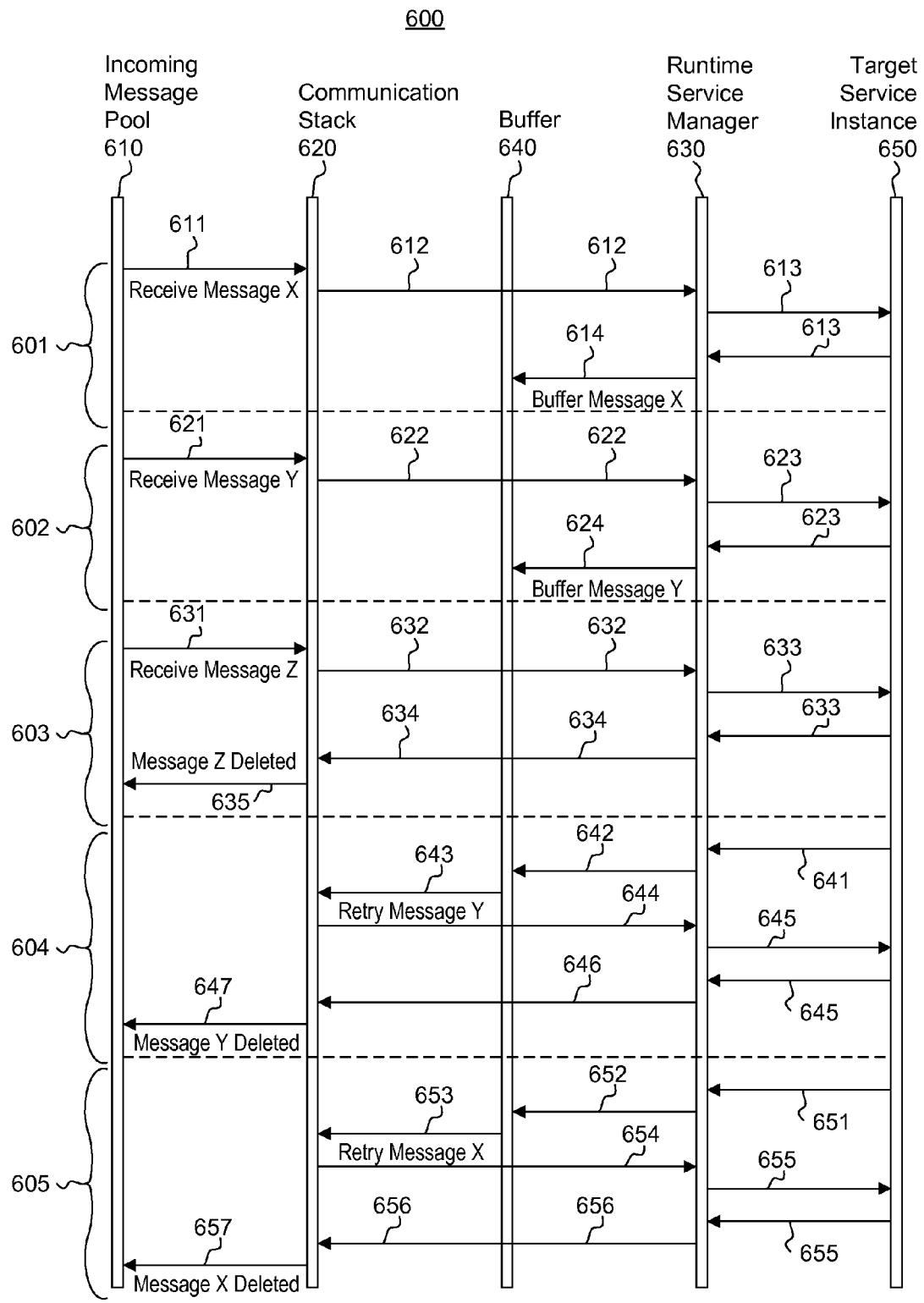
FIG. 6 illustrates a particular walkthrough of various processing flows that may occur in a case to handle out of order methods in accordance with the method of FIG. 3.

FIG. 6 illustrates a particular walkthrough of various processing flows 600 that may occur in a case to handle out of order methods in accordance with the method 300 of FIG. 3, and in which the method 400 of FIG. 4 is used to determine when a message is not ready to be processed in the order provided. The four nodes 610, 620, 630, 640 and 650 of FIG. 6 correspond to the incoming message pool 210, the communication stack 220, the runtime service manager 230, the buffer 240, and a target service instance of the service instances 250, respectively, of FIG. 2.

In this example, there will be three messages received by the communication stack 620 in the following order: first message X, then message Y, then message Z. However, the target service instance is expecting first to process message Z, then message Y, and then message X. The processing flows will now be described.

The first set 601 of processing flows 611, 612, 613, and 614 involve the handling of message X, which is not yet ready to be processed since message Z is expected first by the target service instance.

Flow 611 represents a non-destructive and exclusive receive of message X by the communication stack 620 from the incoming message pool 610 (reference act 301 of FIG. 3). At this point, there are two copies of message X, one locked within the incoming message pool 610, and one being handled by the communication stack 620.

Flow 612 represents that the runtime service manager 630 accesses message X. The runtime service manager may identify that the target service instance 650 is to process message X (reference also act 401 of FIG. 4).

Flows 613 represent that the message X is attempted to be provided to the target service instance (reference act 402 of FIG. 4), but the target service instance indicates that it is not ready to process the message X in the order provided (reference act 403 of FIG. 4), thereby allowing the runtime service instance to conclude that the target service instance is not ready to process the message in the order provided (No in decision block 302). The target service instance may provide this indication in the form of an event called herein a "buffer point" event.

The runtime service manager 630 therefore buffers the message X (reference act 303 of FIG. 3) as represented by flow 614. While the message X is being buffered, a copy of the message X remains within the incoming message pool. Furthermore, one or more other messages may be processed by the target service instance before the message X is recalled from the buffer. In this example, in which the target service instance is to process messages Z, Y and X in that order, the target service instance is to first process message Z, then message Y, before recalling message X from the buffer.

The second set 602 of processing flows 621, 622, 623, and 624 involve the handling of message Y, which is not yet ready to be processed since message Z is expected first by the target service instance.

Flow 621 represents a non-destructive and exclusive receive of message Y by the communication stack 620 from the incoming message pool 610 (reference act 301 of FIG. 3). At this point, there are two copies of message Y, one locked within the incoming message pool 610, and one being handled by the communication stack 620. Flow 622 represents that the runtime service manager 630 accesses message Y. The runtime service manager identifies that the target service instance 650 is to process message Y (reference also act 401 of FIG. 4). Flows 623 represent that the message Y is attempted to be provided to the target service instance (reference act 402 of FIG. 4), but the target service instance indicates (perhaps via a buffer point event) that it is not ready to process the message Y in the order provided (reference act 403 of FIG. 4). This indication allows the runtime service instance to conclude that the target service instance is not ready to process the message in the order provided (No in decision block 302).

The runtime service manager 630 therefore buffers the message Y (reference act 303 of FIG. 3) as represented by flow 624. While the message Y is being buffered, a copy of the message Y remains within the incoming message pool. Furthermore, one or more other messages may be processed by the target service instance before the message Y is recalled from the buffer. In this example, in which the target service instance is to process messages Z, Y and X in that order, the target service instance is to first process message Z before recalling message Y from the buffer.

The third set 603 of processing flows 631, 632, 633, 634 and 635 involve the handling of message Z, which is ready to be processed by the target service instance.

Flow 631 represents a non-destructive and exclusive receive of message Z by the communication stack 620 from the incoming message pool 610 (reference act 301 of FIG. 3). At this point, there are two copies of message Z, one locked within the incoming message pool 610, and one being handled by the communication stack 620. Flow 632 represents that the runtime service manager 630 accesses message Z. The runtime service manager identifies that the target service instance 650 is to process message Z (reference also act 401 of FIG. 4). Flows 633 represent that the message Z is attempted to be provided to the target service instance (reference act 402 of FIG. 4).

In this case, the message is processed by the target service instance (reference act 304 of FIG. 3) as also represented by the flow 633. The runtime service manager may receive some indication that the message Z has been successfully processed (reference Yes in decision block 306). This may occur in the form of an event such as a "Message Consumed" event generated by the target service instance. The runtime service manager 630 thus provides a positive acknowledgement to the communication stack 620 (see flow 634) whereupon, the communication stack 620 deletes the copy of message Z from the message pool (see flow 635) (also reference act 307 of FIG. 3).

At this point, the target service instance is idle and expects a message Y before processing continues. Thus, the target service instance might indicate (perhaps through an "Idle Point" event) that the target service instance needs message Y to continue. The fourth set 604 of flows involve the processing of the buffered message Y in the form of flows 641, 642, 643, 644, 645, 646 and 647. The indication of the idle point event is represented by flow 641, from which the runtime service manager may determine that the target service instance is ready for message Y (reference act 309 of FIG. 3). If the target service instance were ready to handle both message X and Y, the idle point event might indicate that as well, in which case both message X and Y may be retried. In this example, however, it is only message Y that is reattempted at this point.

The runtime instance manager thus gives the buffer instruction to reattempt message Y (see flow 642), whereupon the buffered message Y is again provided to the target service instance (reference act 310 of FIG. 310). This reproviding is accomplished via flows 643, 644 and 645. Specifically, the buffered message Y is received from the buffer 630 by the communication stack 620 (see flow 643). The communication stack then again provides message Y to the runtime service manager (see flow 644), whereupon message Y is again provided to the target service instance 650 (see flow 645). The buffered message Y is provided through the communication stack 620 so that all of the services provided by the communication stack 620 may be applied to the buffered message Y.

This time, the target service runtime indicates successful processing (see also flow 645), whereupon the runtime service manager may determine that message Y was successfully processed (reference Yes in decision block 306 of FIG. 3). At this point, the runtime service manager provides a positive acknowledgement to the communication stack 620 (see flow 646), whereupon the message Y is deleted from the incoming message pool (see flow 647).

At this point, the target service instance is idle and expects a message X before processing continues. After all, the target service instance has now already processed message Z and message Y in the expected order, and is now thus ready for message X. Thus, the target service instance might indicate (perhaps through an "Idle Point" event) that the target service instance needs message X to continue. The fifth set 605 of flows involve the processing of the buffered message X in the form of flows 651, 652, 653, 654, 655, 656 and 657. The indication of the idle point event is represented by flow 651, from which the runtime service manager may determine that the target service instance is ready for message X (reference act 309 of FIG. 3).

The runtime instance manager thus gives the buffer instruction to reattempt message X (see flow 652), whereupon the buffered message X is again provided to the target service instance (reference act 310 of FIG. 310). This reproviding is accomplished via flows 653, 654 and 655. Specifically, the buffered message X is received from the buffer 630 by the communication stack 620 (see flow 653). The communication stack then again provides message X to the runtime service manager (see flow 654), whereupon message X is again provided to the target service instance 650 (see flow 655).

This time, the target service runtime indicates successful processing (see also flow 655), whereupon the runtime service manager may determine that message X was successfully processed (reference Yes in decision block 306 of FIG. 3). At this point, the runtime service manager provides a positive acknowledgement to the communication stack 620 (see flow 656), whereupon the message X is deleted from the incoming message pool (see flow 657).

Figure 7:
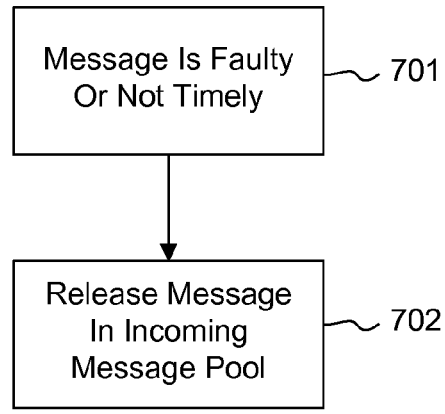
FIG. 7, illustrates a flowchart of a method for processing a faulty or untimely message.

Had any of the messages failed to be processed correctly by the target service instance, the target service instance would indicate such to the runtime service manager, whereupon the runtime service manager would provide a negative acknowledgement to the communication stack. At this point, the communication stack would release the lock of the corresponding message in the incoming message pool. The message would then be again available for receiving from the incoming message pool. This process is represented in FIG. 7, which illustrates a flowchart of a method 700 for processing a faulty or untimely message. Upon determining that the processing of a message is faulty or not timely (act 701), the exclusivity (i.e., the lock) of the message is released (act 702) in the incoming message pool. In one embodiment, if it may be determined from the log recorded at the time the message was buffered, that the message is permanently unprocessable, the message may removed from the incoming message pool.

Figure 8:
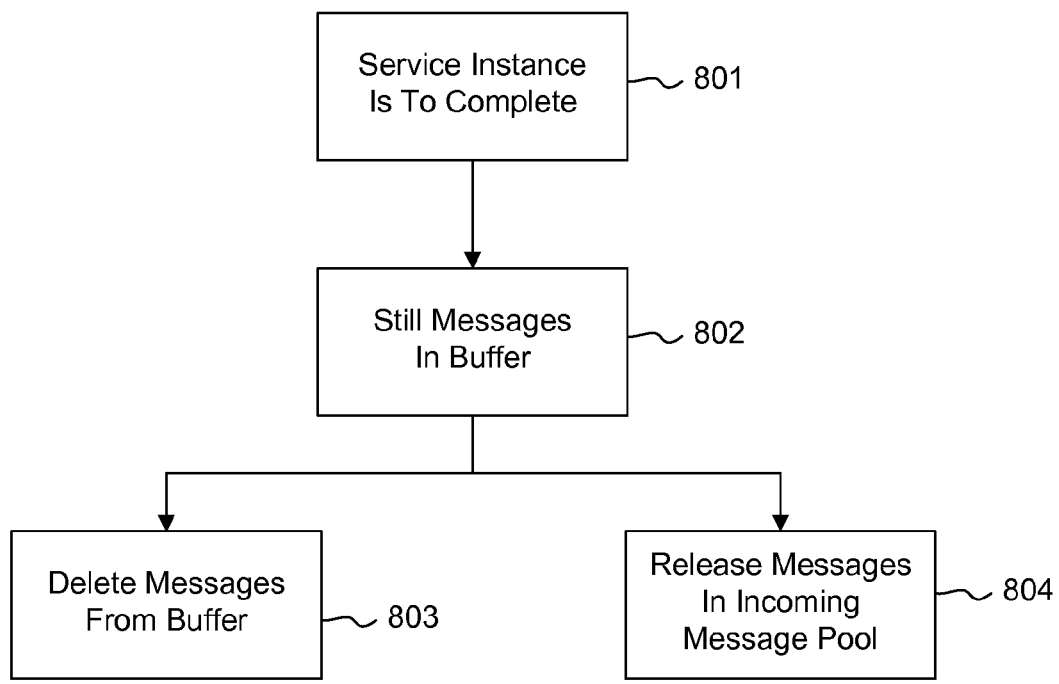
FIG. 8 illustrates a flowchart of a method for completing processing of a service instance.

FIG. 8 illustrates a flowchart of a method 800 for completing processing of a service instance. Upon determining that a particular service instance has completed processing (act 801), it is possible that there might still be unnecessary messages in the buffer that were awaiting processing by the particular service instance. To avoid unnecessary accumulation of messages within the buffer, upon completing processing (act 801) of a service instance, the runtime service manager may check the buffer, and if there are one or more messages that still remain within the buffer that were to be provided to the particular service instance (act 802), the runtime service deletes the message from the buffer (act 803), and causes the message to be released in the incoming message pool (act 804) so that it can be further processed by another service instance.

As part of the non-destructive and exclusive receive of messages from the incoming message pool (reference act 301 of FIG. 3), an optional filtration process may be applied to the incoming message pools. FIG. 10 illustrates a flowchart of a method 1000 for filtering incoming messages as they are received from the incoming message pool.

In the method 1000, the incoming message pool receives an indication from a particular target service instance that the particular target service instance is ready to process messages of certain type (act 1001). A filter is then applied to the incoming message pool that excludes at least some messages for other service instances or message types (act 1002). When messages are subsequently received from the incoming message pool, the restrictions of the filter are applied (act 1003).

Even with the filtering of FIG. 10, messages may still be received that cannot be immediately processed. Accordingly, once a message is received from the incoming message pool, the method 300 of FIG. 3 may proceed at decision block 302, where the runtime service manager determines whether the target service instance is ready to process the message in the order provided. The benefit of applying the method 1000 of FIG. 10 is that as the quality of filtering improves, it becomes increasingly rare to require buffering a message.

Thus, a mechanism is described in which messages may be dispatched to service instances even if they are out of order, using a buffer to hold messages that are not yet ready to be processed in the order provided. In one further embodiment, this may be accomplished without a buffer. Accordingly, instead of there being two copies of buffered message (one being the locked message within the incoming message queue, and one being the buffered copy of the message), there is only the copy of the message in the incoming message pool. Thus, referring to FIG. 2, there would be no requirement for a buffer 240 in this alternative embodiment.

Figure 9:
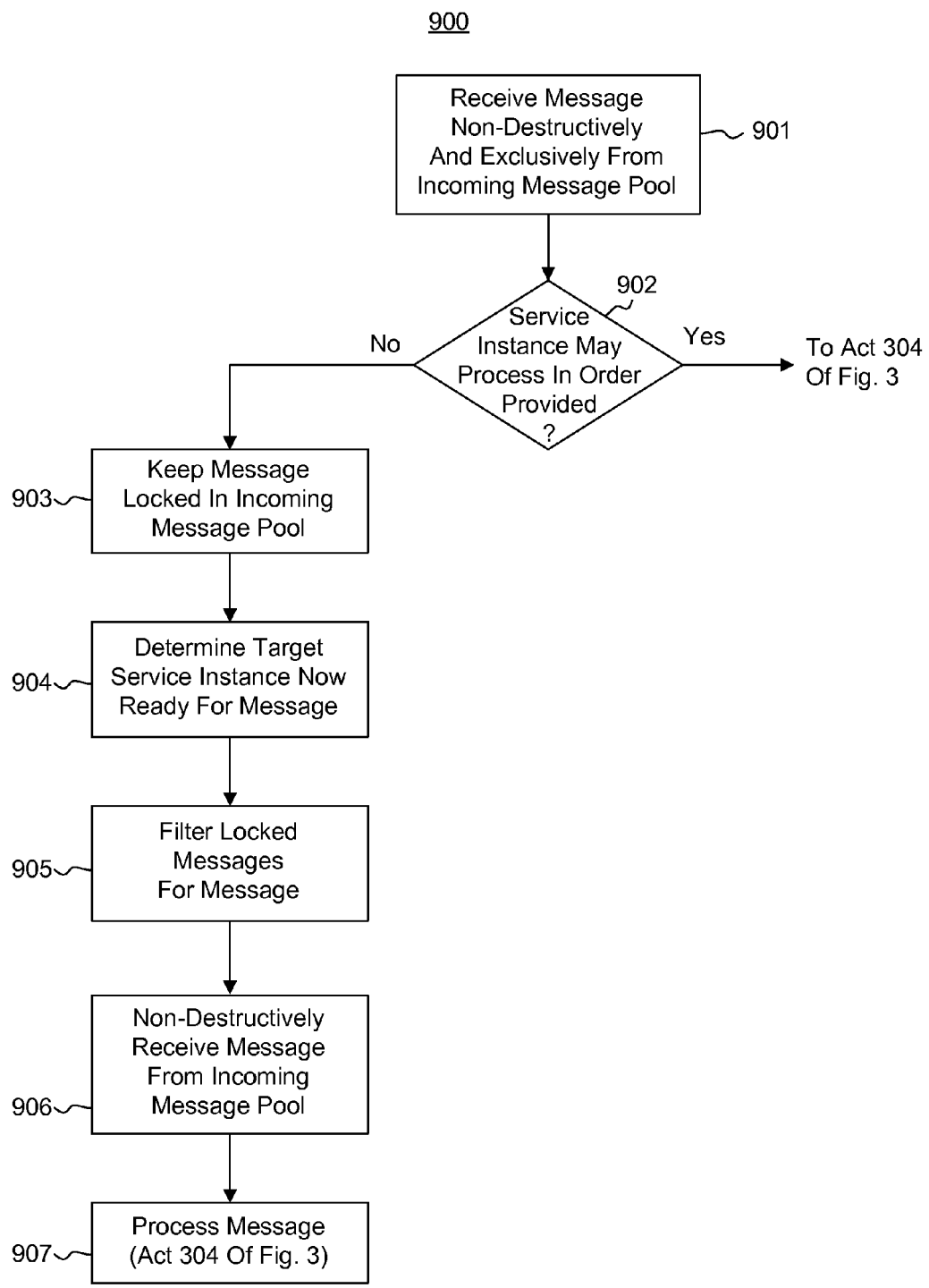
FIG. 9 illustrates a flowchart of a method for dispatching messages from the incoming message pool to the service instance in an alternative embodiment in which a buffer is not used.

FIG. 9 illustrates a flowchart of a method 900 for dispatching messages from the incoming message pool to the service instance in this alternative embodiment.

Once again, the method 900 is performed whenever a message is non-destructively and exclusively received by the communication stack from the incoming message pool (act 901). If there is a target service instance that can process the message (Yes in decision block 902), then processing may proceed to act 304 of FIG. 3, wherein the message is processed, and the message is either deleted from the incoming message pool or released from the incoming message pool, depending on whether the message was successfully processed.

If it is determined that the message cannot be processed in the order provided (No in decision block 902), then the message is simply kept locked in the incoming message pool (act 903), and the copy of the message that was received by the communication stack may be discarded, rather than buffered. Other messages may then be processed from the incoming message pool as previously described. Of course, some of these other message might also be out of order. Accordingly, this might result in a number of messages being locked in the incoming message pool, that are awaiting processing by a target service instance.

At some point, the runtime service manager may receive an indication from the target service instance that the target service instance is now ready to receive the message previously attempted. This indication might, for example, take the form of an Idle Point event). Based on this indication, the runtime service manager may determine that the target service instance is now ready to process the previously attempted message that remains locked in the incoming message pool (act 904). In response, the communication stack may filter through all of the messages in the incoming message pool that are locked to the target service instance (act 905), and once again non-destructively receive the message from the incoming message pool (act 906). This time, the target service instance processes the message (act 907).

Thus, several embodiments for processing message that arrive out of order have been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dispatching messages from an incoming message pool to a plurality of service instances such that the messages are processed in a proper order, the method comprising:

an act of non-destructively and exclusively receiving a first message from the incoming message pool such that a copy of the first message remains within the message pool and the copy of the first message that remains in the incoming message pool is locked for exclusive use by the service instance that is to process the message;

an act of determining that none of the plurality of service instances is capable of processing the first message at least in the order provided;

in response to the act of determining, buffering the unprocessed first message in a buffer separate from the message pool and deferring processing of the first message until it can be processed in the proper order;

while the unprocessed first message is buffered, an act of non-destructively and exclusively receiving a second message from the incoming message pool such that there are two copies of the second message, one locked copy remaining in the incoming message pool and one copy being handled by a communication stack;

an act of identifying a particular service instance that is capable of processing the second message in the order provided; and subsequent to the particular service instance processing the second message, determining that the particular service instance is ready to process the buffered first message; and an act of providing the buffered first message from the message buffer to the particular service instance for processing in the proper order.

2. The method in accordance with claim 1, wherein the act of determining that none of the plurality of service instances is capable of processing the first message comprises:

an act of identifying the particular service instance that is to process the first, message; and an act of attempting to provide the first message to the particular service instance; and an act of receiving a response from the particular service instance indicating that the particular service instance is not capable of processing the first message in the order provided.

3. The method in accordance with claim 1, wherein the act of determining that none of the plurality of service instances is capable of processing the first message comprises:

before the act of receiving the first message, an act of receiving an indication from the particular service instance that the particular service instance is not ready to handle messages of a particular type; and after the act of receiving the first message, an act of determining that the first message is of the particular type that the particular service instance indicated that the particular service instance is not ready to handle.

4. The method in accordance with claim 1, wherein the act of buffering the first message in response to the act of determining comprises:

an act of removing the first message from memory while remaining locked in the incoming message pool for exclusive use by the particular service instance; and subsequent to the act of removing the first message from memory and prior to the act of providing the buffered first message from the message buffer to the particular service instance, an act of again non-destructively receiving the first message from the incoming message pool.

5. The method in accordance with claim 1, further comprising the following subsequent to the particular service instance processing the second message:

an act of deleting the second message from the incoming message queue in response to the particular service instance processing the second message.

6. The method in accordance with claim 5, further comprising the following subsequent to the particular service instance processing the first message:

an act of deleting the first message from the incoming message queue in response to the particular service instance processing the first message.

7. The method in accordance with claim 1, further comprising:

an act of determining that the processing of the first message is faulty and/or not timely; and in response to the determination that the processing of the first message is faulty and/or not timely, an act of releasing the exclusivity of the first message in the incoming message pool.

8. The method in accordance with claim 7, further comprising:

an act of recording in a log associated with the first message an indication that the particular service instance was temporarily unable to process the first message.

9. The method in accordance with claim 8, further comprising:

an act of examining a log associated with the first message for information regarding past attempts at processing the message;

an act of determining that the first message is permanently unprocessable, the determination responsive to the information obtained by examining the log; and an act of removing the first message from the incoming message pool.

10. The method in accordance with claim 1, further comprising:

an act of determining that the particular service instance has completed;

an act of determining that there are still one or more messages within the buffer that were to be provided to the particular service instance, but which remain after the particular service instance has completed; and in response to the act of determining that there are still one or more messages within the buffer, an act of releasing the exclusivity of the one or more messages in the incoming message pool.

11. The method in accordance with claim 1, wherein after the particular service instance processes the second message, but before the act of providing the buffered first message to the particular service instance, the method further comprises:

an act of receiving an indication from the particular service instance that the particular service instance is ready for the first message.

12. The method in accordance with claim 1, wherein the incoming message pool is an incoming queue.

13. The method in accordance with claim 1, the method further comprising the following after the act of buffering the first message and before the act of non-destructively and exclusively receiving the second message:

an act of non-destructively and exclusively receiving a third message from the incoming message pool;

an act of determining that none of the plurality of service instances is capable of processing the third message at least in the order provided;

an act of buffering the third message in response to the act of determining that none of the plurality of service instances is capable of processing the third message at least in the order provided; and subsequent to the processing service instance processing the second message, an act of providing the buffered third message from the message buffer to the particular service instance.

14. The method in accordance with claim 13, wherein after the particular service instance processes the second message, but before the act of providing the buffered first message to the particular service instance and before the act of providing the buffered third message to the particular service instance, the method further comprises:

an act of receiving an indication from the particular service instance that the particular service instance is ready for the first message and the third message.

15. A computer program product comprising one or more physical computer-readable storage devices having thereon computer-executable instructions that, when executed by one or more processors of a computing system, cause the computing system to perform the method of claim 1.

16. The computer program product in accordance with claim 15, wherein determining that none of the plurality of service instances is capable of processing the first message at least in the order provided comprises identifying that the first message arrived out of order and one or more intervening messages must be processed before processing the first message.

17. A method for dispatching messages from an incoming message pool to a plurality of service instances such that the messages are processed in the proper order, the method comprising:

an act of non-destructively receiving a first message from the incoming message pool such that a copy of the first message remains within the message pool;

an act of locking the first message in the incoming message pool such that only one of the plurality of service instances can process the first message;

an act of determining that none of the plurality of service instances is capable of processing the first message at least in the order provided;

in response to determining that none of the plurality of service instances is capable of processing the first message at least in the order provided, deferring the processing of the first message until the first message can be processed in the proper order;

while keeping the first message locked in the incoming message pool, an act of non-destructively receiving a second message from the incoming message pool;

an act of locking the second message in the incoming message pool such that there are two copies of the second message, one locked copy remaining in the incoming message pool and one copy being handled by a communication stack; and an act of identifying a particular service instance that is capable of processing the second message in the order provided; and subsequent to the particular service instance processing the second message, an act of again non-destructively receiving the first message from the incoming message pool, determining that the particular service instance is ready to process the buffered first message, and providing the first message to the particular service instance for processing in the proper order.

18. The method in accordance with claim 17, further comprising the following subsequent to the particular service instance processing the second message, and before the act of again non-destructively receiving the first message from the incoming message pool:

an act of receiving an indication from the particular service instance that the particular service instance may be ready to handle the first message.

19. The method in accordance with claim 18, further comprising the following after the act of receiving an indication from the particular service instance that the particular service instance may be ready to handle the first message, and before the act of again non-destructively receiving the first message from the incoming message pool:

an act of filtering through one or more locked messages within the incoming message pool for messages locked for the particular service instance.

20. The method in accordance with claim 17, further comprising the following after the act of buffering the first message and before the act of non-destructively and exclusively receiving the second message:

while keeping the first message locked in the incoming message pool, an act of non-destructively receiving a third message from the incoming message pool;

an act of locking the third message in the incoming message pool;

an act of determining that none of the plurality of service instances is capable of processing the third message at least in the order provided, wherein the act of non-destructively receiving the second message from the incoming message pool occurs while keeping the third message locked in the incoming message pool.

* * * * *